(12) United States Patent
Bowcutt (10) Patent No.: US 6,634,594 B1
(45) Date of Patent: Oct. 21, 2003

(54) HYPERSONIC WAVERIDER VARIABLE LEADING EDGE FLAPS

(75) Inventor: Kevin G. Bowcutt, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/138,610

(22) Filed: May 3, 2002

(51) Int. Cl.$^7$ .................................................. B64C 3/28
(52) U.S. Cl. ........................................ 244/35 A; 244/36
(58) Field of Search ........................... 244/35 A, 214, 244/36, 35 R, 219, 45 R, 45 A, 213

(56) References Cited

U.S. PATENT DOCUMENTS

| | | | |
|---|---|---|---|
| 2,749,060 A | * | 6/1956 | Brady et al. |
| 3,143,317 A | * | 8/1964 | Walley et al. |
| 4,161,300 A | | 7/1979 | Schwaerzler et al. |
| 4,293,110 A | | 10/1981 | Middleton et al. |
| 4,706,913 A | * | 11/1987 | Cole |
| 4,729,528 A | | 3/1988 | Borzachillo |
| 5,062,595 A | * | 11/1991 | Maxworthy |
| 5,094,411 A | | 3/1992 | Rao |
| 5,156,358 A | | 10/1992 | Gerhardt |
| 5,253,828 A | | 10/1993 | Cox |
| 5,337,975 A | * | 8/1994 | Peinemann |
| 5,538,201 A | * | 7/1996 | Gerhardt |
| 5,842,666 A | | 12/1998 | Gerhardt et al. |
| 5,897,076 A | | 4/1999 | Tracy |
| 5,921,506 A | | 7/1999 | Appa |

FOREIGN PATENT DOCUMENTS

| | | | | |
|---|---|---|---|---|
| EP | 0162312 | * | 11/1985 | ................. 244/213 |
| GB | 375515 | * | 6/1932 | ................. 244/36 |

* cited by examiner

*Primary Examiner*—Tien Dinh
(74) *Attorney, Agent, or Firm*—Harness Dickey & Pierce P.L.C.

(57) ABSTRACT

A hypersonic aircraft producing a shock wave during hypersonic flight. The shape of the shock wave changes depending upon changes in Mach speed and angle of attack, the latter of which can vary significantly with flight dynamic pressure. The aircraft includes a body, a pair of wings coupled to the body (or a wing-body) having leading edges, and a deflectable flap system operably coupled to the hinge line of each of the pair of wings. The flap system is positionable in a plurality of positions relative to the pair of wings so as to achieve a generally optimal position capable of maintaining attachment of the shock wave along the leading edge of the flap system at hypersonic speeds. A controller is further operably coupled to the deflectable flap systems for determining the optimal position and outputting a signal that drives the flap system.

12 Claims, 7 Drawing Sheets

DELTA WING WITH LEADING EDGE WAVERIDER FLAPS DEPLOYED.

MAXIMUM LIFT-TO-DRAG RATIO COMPARISON FOR VARIOUS HYPERSONIC CONFIGURATIONS.

Fig-1

Fig-2 OBLIQUE SHOCK DIAGRAM OF SHOCK ANGLE VS. FLOW DEFLECTION ANGLE AND MACH NUMBER.

Fig-3A

DELTA WING WITH LEADING EDGE WAVERIDER FLAPS DEPLOYED.

MACH 15

*Fig-3E*

MACH 20

*Fig-3F*

MACH 25

*Fig-3G*

MACH 4 WAVERIDER

Fig-4A

MACH 6 WAVERIDER

Fig-4B

MACH 10 WAVERIDER

Fig-4C

MACH 15 WAVERIDER

*Fig-4D*

MACH 20 WAVERIDER

*Fig-4E*

MACH 25 WAVERIDER

*Fig-4F*

HYPERSONIC WAVERIDER VARIABLE LEADING EDGE FLAPS

FIELD OF THE INVENTION

The present invention relates to aircraft performance and control and, more particularly, relates to variable leading edge flaps for use on hypersonic waverider-type aircraft.

BACKGROUND OF THE INVENTION

Figure 1:
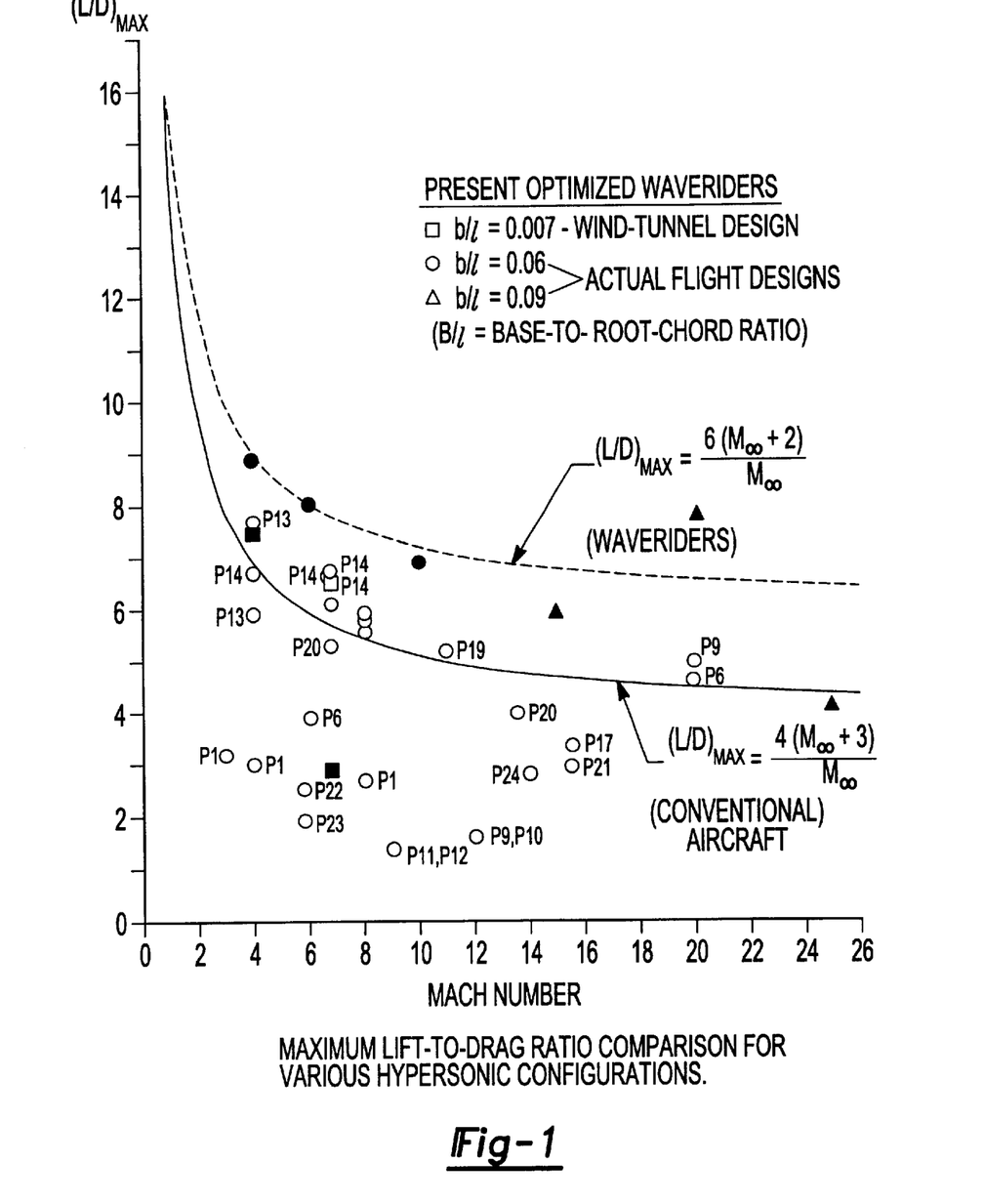
FIG. 1 is a graphical representation of the comparative lift-to-drag ratio between waverider aircraft and conventional aircraft.

As is known in the art, an aircraft traveling at Mach 1 or higher produces a shock wave in air. If the aircraft is tailored correctly, it can be designed to ride this shock wave to produce greater lift, less drag, greater range, and overall improved performance. Such aircraft are commonly referred to as waveriders. Waveriders are particularly useful at high Mach numbers when shock losses (wave drag) become increasingly large. Waveriders reduce shock losses by reducing the shock angle necessary to generate the required lift, which improves the lift-to-drag (UD) ratio of the aircraft and, thus, improves its overall performance. As best seen in FIG. 1, a comparison of conventional aircraft and waveriders is illustrated showing the UD ratio of waverider and conventional aircraft for speeds above about Mach 2. In this graph, one can see that although UD ratios above about 7 are difficult to achieve at speeds higher than Mach 5 for a conventional aircraft, a waverider is capable of 30–50% higher UD ratios than conventional aircraft operating at the same speed. Furthermore, as can be seen from FIG. 1, this improved UD ratio and thus overall performance is most pronounced at hypersonic speeds, which typically begins at about Mach 5.

According to supersonic flow theory, as supersonic flow passes over a wedge body, a shock wave is formed at the apex (point) of the wedge. This shock wave produces compression lift. Compression lift is that lift produced due to the increase in surface pressure exerted on the underside of a supersonic vehicle due to the pressure rise across a shock wave. Maximizing compression lift is the principle benefit of the waverider concept.

In general, hypersonic aircraft suffer from low UD ratios. However, in order to overcome this problem, waveriders are designed to maintain an attached shock along their leading edges. That is, the shock wave is not detached from the leading edge, where detachment would allow high-pressure air that generates lift to spill around the leading edges, reducing lift, thereby requiring an increase in wing angle-of-attack to maintain lift, with an attendant increase in shock angle, wave drag, and induced drag. The wings thus are able to maximize the compression lift created by the shock wave, without adding any unnecessary drag; however, as will be described below, conventional waverider wing designs are only optimized for a single Mach speed and angle of attack condition.

Generally, waverider aircraft provide numerous advantages over conventional aircraft when travelling at high Mach speeds, such as, but not limited to, producing only positive lift; maintaining an attached leading edge shock, which minimizes spillage of high-pressure air from the bottom surface of the wing, thereby minimizing lateral flow losses; and minimizing cross flow, which aids in maintaining natural laminar boundary layer flow, which reduces frictional drag and aerodynamic heating.

Figure 2:
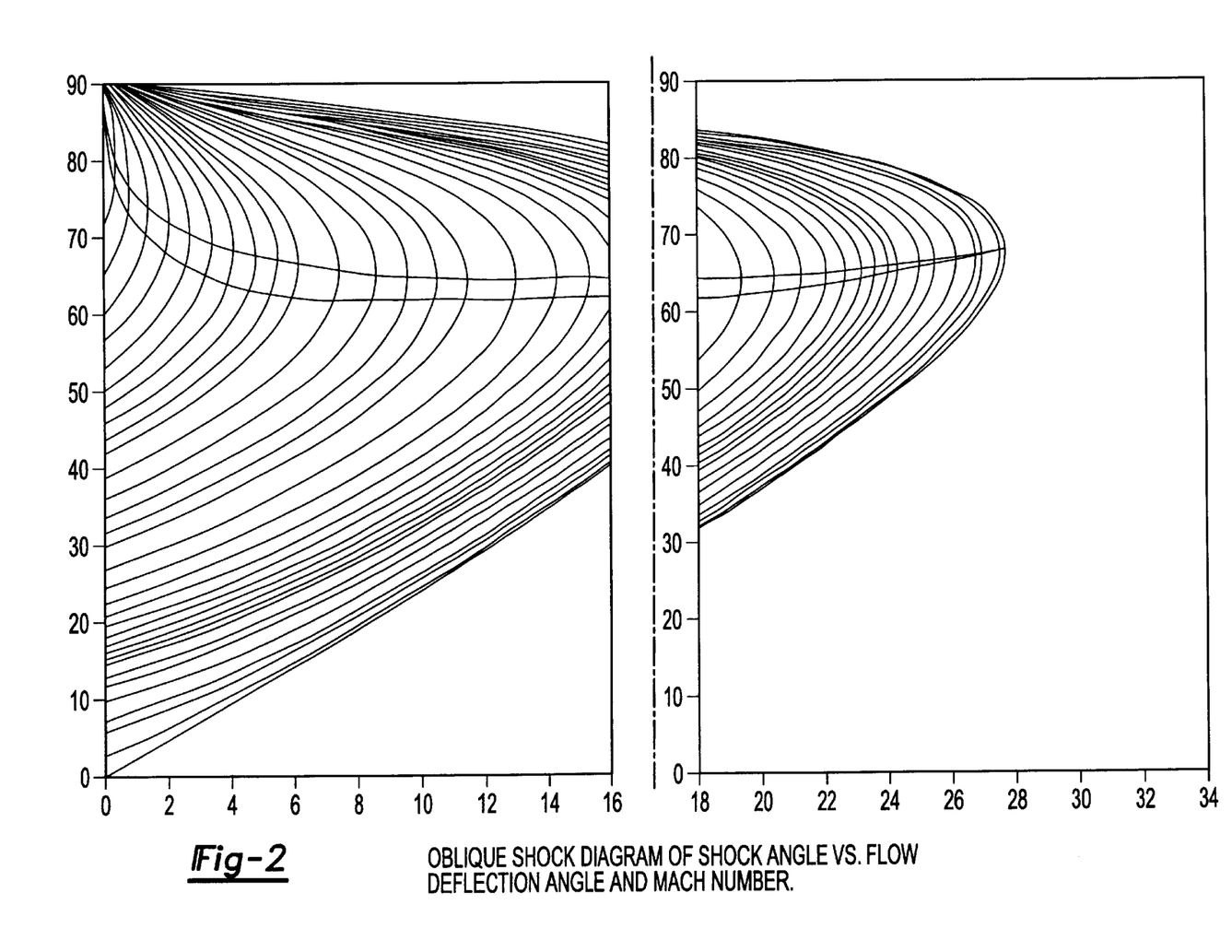
FIG. 2 is an oblique shock diagram of shock angle versus flow deflection angle and Mach number.

Unfortunately, conventional waveriders are typically designed for use at a single, specific Mach number and a specific angle of attack. That is, the bow shock wave created by a typical hypersonic wing, including a waverider, detaches from the wing leading edge when the combination of Mach number and flow incidence angle resolved in a plane normal to the leading edge is outside the range that would yield an attached shock solution on a two-dimensional wedge, as seen in FIG. 2. Under detached shock conditions, flow can spill around the wing leading edge, thereby reducing lower surface pressure and, thus, lift. Accordingly, the particular usefulness of waveriders may be limited to a very small operational envelope—a small range of Mach number and angle of attack. This small operational envelope inhibits high-performance operation outside of the predetermined set of narrow parameters and, thus, limits the versatility and performance of conventional waveriders.

Therefore, there exists a need in the relevant art to provide a hypersonic aircraft that is capable of operating as a waverider within a broader operational envelope. Furthermore, there exists a need in the relevant art to provide a hypersonic waverider aircraft capable of changing its structural configuration to accommodate varying Mach numbers and angles of incidence. Still further, there is a need in the relevant art to provide a hypersonic waverider aircraft capable of overcoming the disadvantages of the prior art.

SUMMARY OF THE INVENTION

According to the teachings of the present invention, a hypersonic aircraft having an advantageous construction. The hypersonic aircraft produces a shock wave during hypersonic flight. The shape of the shock wave changes depending upon dynamic variations attributed to changes in Mach speed and flight attitude. The aircraft includes a body, a pair of wings coupled to the body having leading edges (or a blended wing-body), and a deflectable flap system operably coupled to the leading edge of each of the pair of wings. The flap system is positionable in a plurality of positions relative to the pair of wings so as to achieve a generally optimal position capable of maintaining attachment of the shock wave along the leading edge of the flap system at hypersonic speeds. A controller is further operably coupled to the deflectable flap systems for determining the optimal position and outputting a signal that drives the flap system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For example, the principles of the present invention may be used in a wide variety of hypersonic aircraft designs.

Figure 3A:
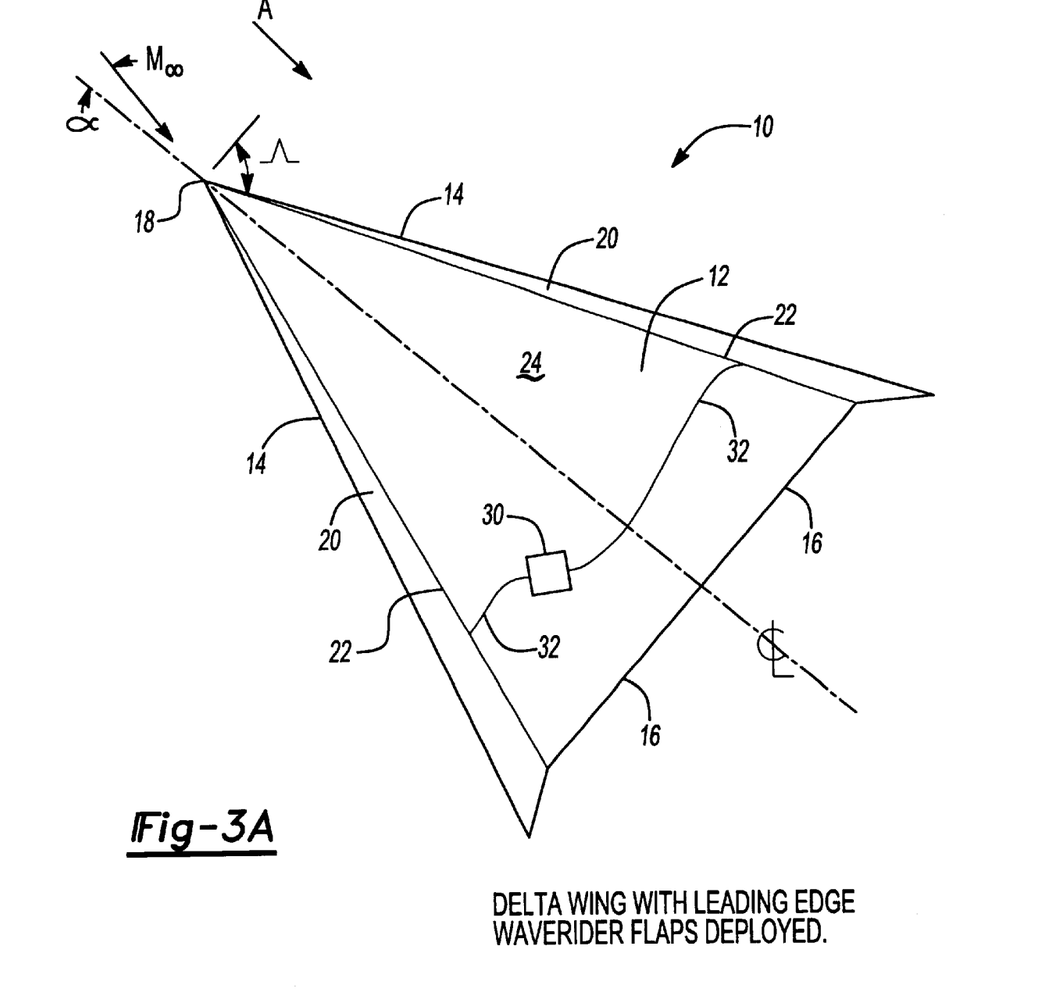
FIG. 3(a) are perspective schematic view of a hypersonic aircraft employing the hypersonic waverider variable leading edge flaps of the present invention.
Figure 3B:
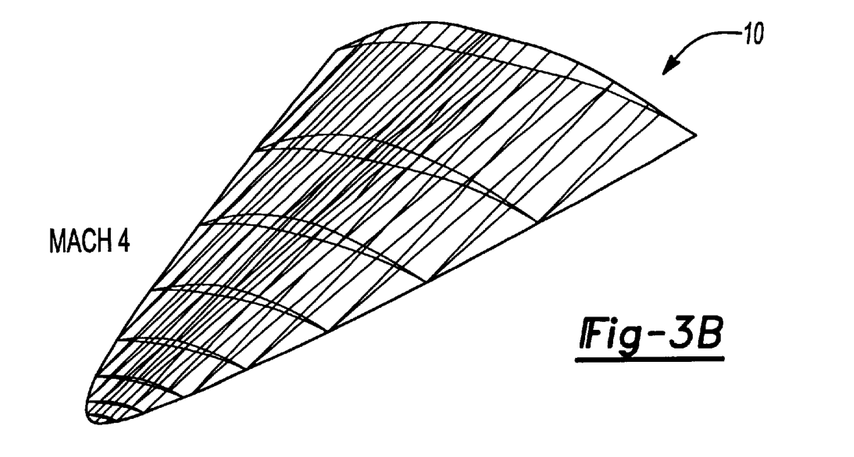
FIGS. 3(b)–(g) are perspective representations of hypersonic aircraft configured for operation at Mach 4, 6, 10, 15, 20, and 25, respectively.
Figure 3C:
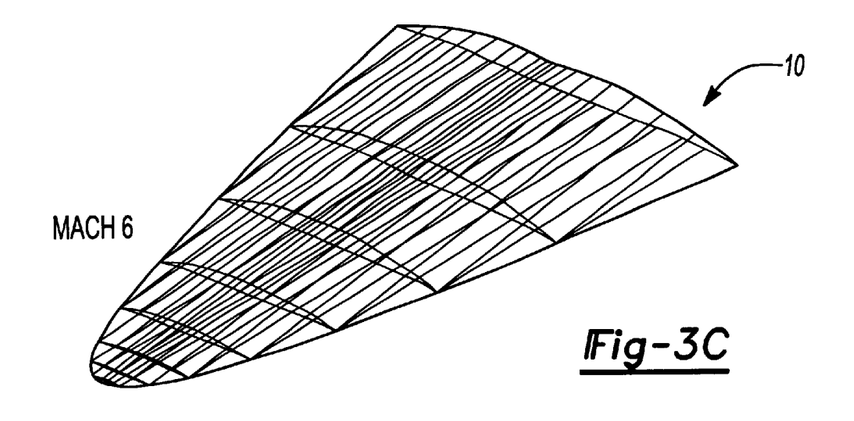
Figure 3D:
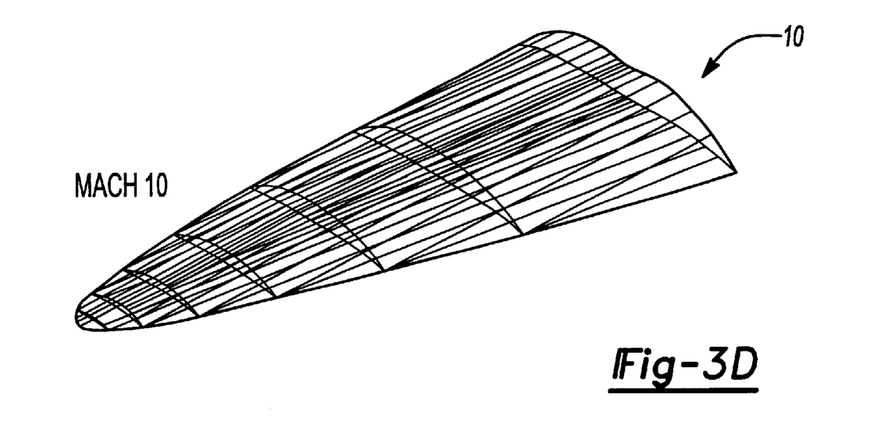
Figure 3E:
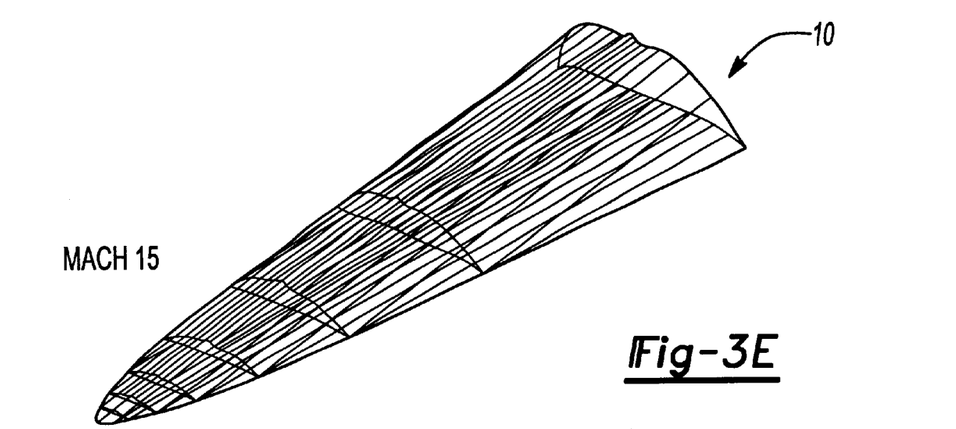
Figure 3F:
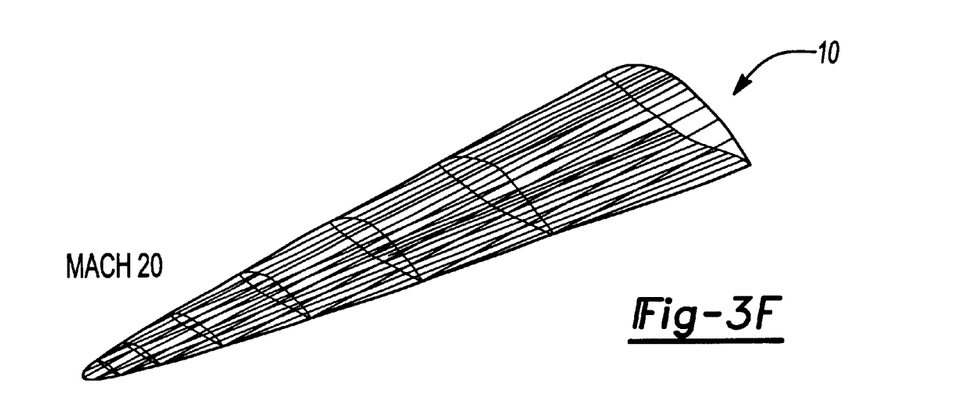
Figure 3G:
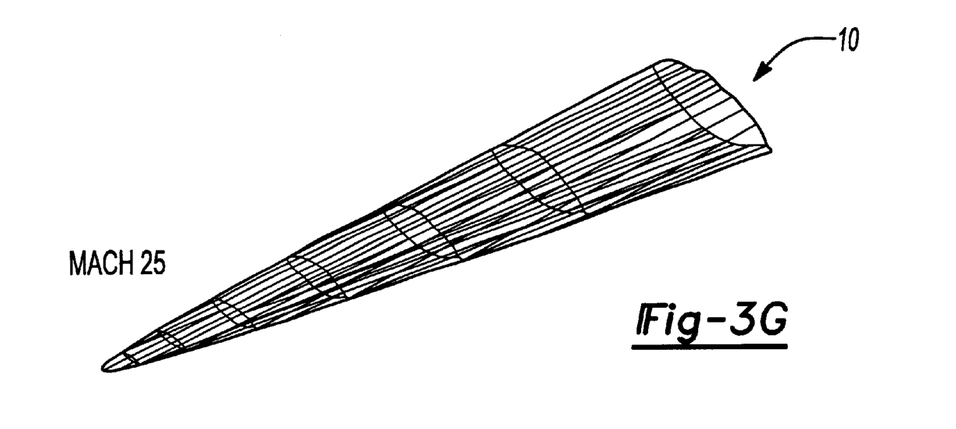
Figure 4A:
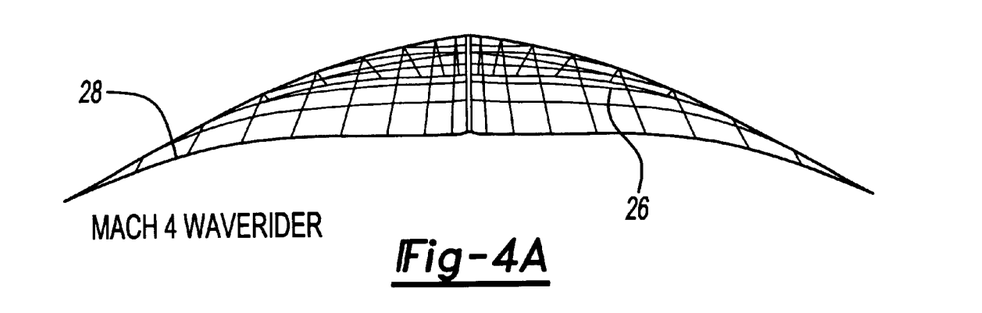
FIGS. 4(a)–(f) are front cross-sectional representations of hypersonic aircraft configured for operation at Mach 4, 6, 10, 15, 20, and 25, respectively.
Figure 4B:
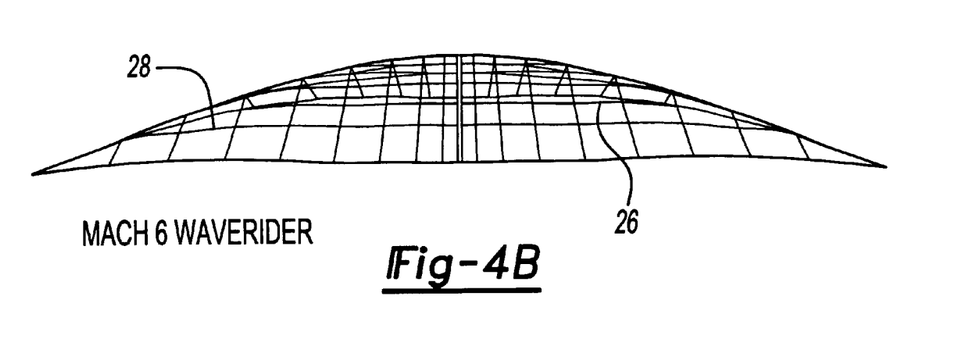
Figure 4C:
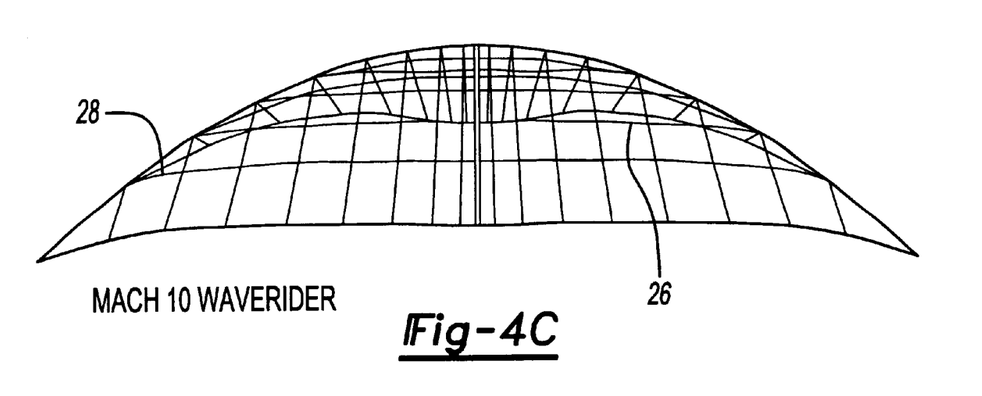
Figure 4D:
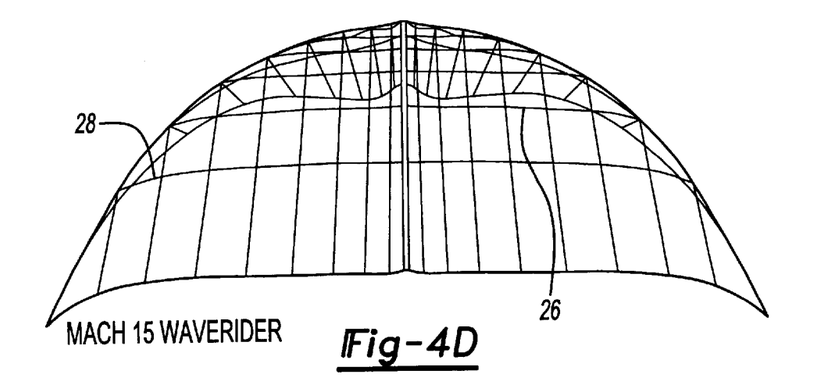
Figure 4E:
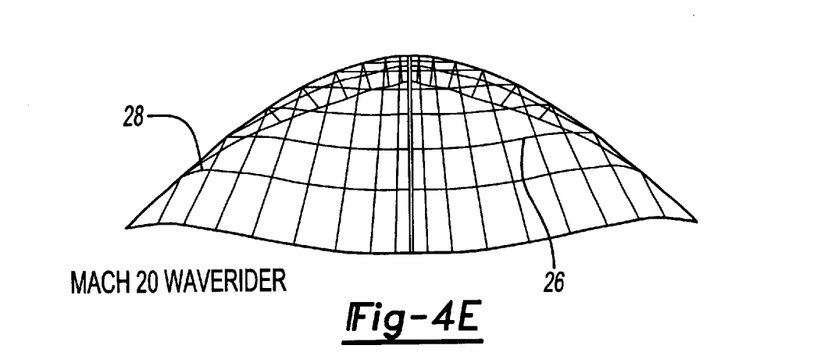
Figure 4F:
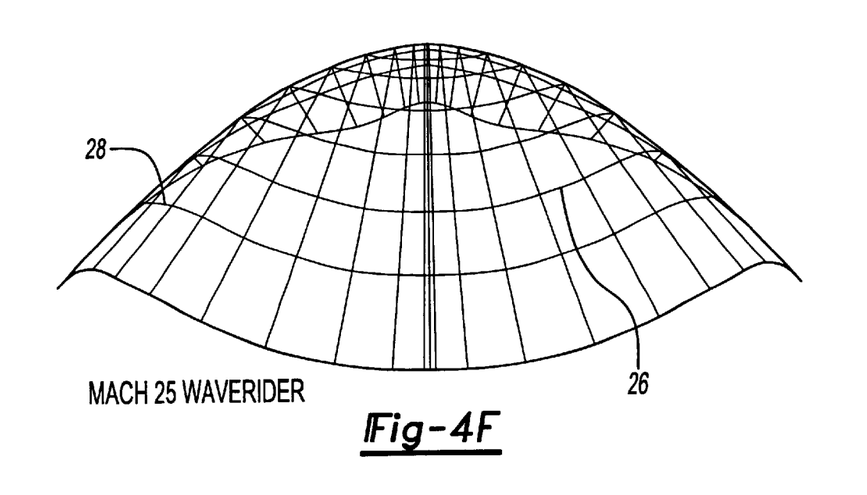

As best seen in FIG. 3(a), a wing-body aircraft 10 configured for hypersonic flight above approximately Mach 5 is illustrated. Wing-body aircraft 10 includes a pair of leading edges 14 and a pair of trailing edges 16. The pair of leading edges 14 terminates at a nose section 18. Wing-body aircraft 10 further includes at least a pair of waverider flaps 20. It should be appreciated that wing-body aircraft 10 may have any one of a number of different configurations, including a delta-wing configuration, a wing-body configuration, and the like.

Waverider flaps 20 are configured specifically to extend the range of flight Mach numbers and angles of attack over which the wing bow shock wave remains attached to leading edges 14. Waverider flaps 20 are hingedly coupled to wing-body aircraft 10 along hinge lines 22. In other words, waverider flaps 20 are hingedly coupled to wing-body aircraft 10 along hinge lines 22 extending generally offset from leading edges 14. As will be described below, waverider flaps 20 are generally deflected so as to maintain the angle between the airflow A and the waverider flaps 20 in the vicinity of leading edge 14 below the critical limit, thereby maintaining an attached hypersonic flow on the waverider flaps 20. With particular reference to FIGS. 3(b)–(g), various configurations of wing-body aircraft 10 are illustrated showing generally how waverider contouring varies with Mach number. Therefore, in operation, waverider flaps 20 are varied to optimize the waverider contour of wing-body aircraft 10 as a function of Mach number and angle of attack.

As best seen in FIGS. 4(a)–(f), it is necessary to vary the front cross-sectional buildup of wing-body aircraft 10 to achieve the necessary cross-sectional shape that maximizes the UD ratio and, thus, the overall performance of wing-body aircraft 10 for a specific Mach speed and angle of attack. Specifically, in FIG. 4(a), a cross-sectional shape is depicted for optimal operation at Mach 4 for a given angle of attack. Similarly, in FIGS. 4(b)–(f), the cross-sectional shapes are depicted for optimal operation at Mach 6, 10, 15, 20, and 25 for a given angle of attack, respectively. As described above, it is typical that such waverider aircraft are designed so as to be optimized for a specific Mach number and, thus, are generally not capable of optimal performance outside of the design parameters.

Still referring to FIGS. 4(a)–(f), each cross-sectional shape of wing-body aircraft 10 consists of a generally uniformly flat or curved undersurface 26 with concave strakes 28 near leading edges 14. However, in order to enable wing-body aircraft 10 to operate in an optimized cross-sectional configuration, waverider flaps 20 are articulated so as to vary the cross-section of wing surface 24 to tailor leading edge geometry in flight to changing flight conditions. That is, waverider flaps 20 are used to modify or vary the cross-sectional shape of wingbody aircraft 10 along hinge lines 22 to create strakes 28 near leading edges 14. Therefore, shock wave attachment is maintained over a broad range of conditions by articulating waverider flaps 20 about hinge lines 22.

Preferably, waverider flaps 20 are variable droop hinged leading edge flaps. Waverider flaps 20 may similarly be used as vortex flaps during supersonic flight and landing flaps during low speed operations.

Waverider flaps 20 are articulated and/or deployed preferably in response to a controller 30. Controller 30 actuates a drive system 32, which is coupled to waverider flaps 20. Positioning of waverider flaps 20 is determined through either a pre-programmed set of parameters that coincide with current Mach speed and angle of attack data or is computed in real-time in response to data received from a plurality of onboard sensors in order to maintain optimal lift-to-drag ratio performance.

For most hypersonic cruise vehicles, high dynamic pressure (Q) flight is required during acceleration to generate adequate engine thrust from the propulsion engines. However, low dynamic pressure flight is preferred during cruise. The high dynamic pressure may be as much as three to five times the low dynamic pressure, which dramatically alters angle-of-attack requirements in flight. As mentioned above, conventional hypersonic aircraft and waveriders cannot be optimized at both of these dynamic pressures.

According to the present invention, waverider flaps 20 are articulated so as to define an almost infinite number of optimal shapes (see FIGS. 4(a)–(f)) for the entire range of Mach number and angle of attack over which wing-body aircraft 10 is required to operate.

Furthermore, port and starboard waverider flaps 20 may be actuated independently to achieve greater lateral/directional dynamic stability and control. By deflecting an outboard edge of waverider flaps 20 opposedly upward and downward during flight, lateral and directional moments will be created on the wing-body aircraft 10 to effect lateral and directional control, respectively.

At subsonic and low supersonic speeds, waverider flaps 20 can be deflected uniformly downward to be used as vortex flaps to increase lift and reduce drag at high angles of attack for takeoff, landing, and maneuvering. Vortex flaps produce a stable vortex above the flap that creates a low pressure lift and thrust suction force on the vortex flap. Moreover, waverider flaps 20, when individually actuated, again aid in lateral and directional control.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hypersonic aircraft producing a shock wave, a shape of said shock wave changing depending on Mach number and angle of attack, said aircraft comprising:

a body;

a pair of wings coupled to said body, said pair of wings being shaped to produce lift;

a deflectable flap system operably coupled to said pair of wings, said flap system being adjustable in a plurality of positions relative to said pair of wings so as to achieve a generally optimal position capable of maintaining attachment of the shock wave along a leading edge of said deflectable flap system at hypersonic speeds; and a controller operably coupled to said deflectable flap systems, said controller determining said optimal position and outputting a signal.

2. The hypersonic aircraft according to claim 1 wherein each of said deflectable flap systems comprises:

a flap member hingedly coupled to said pair of wings along a hinge line; and a drive system operably pivoting said flap member about said hinge line in response to said signal.

3. The hypersonic aircraft according to claim 2 wherein said hinge line is generally aft of said leading edge.

4. The hypersonic aircraft according to claim 2 wherein each of said flap members is individually actuatable.

5. The hypersonic aircraft according to claim 1 wherein said body and said pair of wings are integrally formed to define a generally continuous blended lifting member.

6. A hypersonic aircraft producing a shock wave, a shape of said shock wave changing depending on Mach number and angle of attack, said aircraft comprising:

a body;

a pair of wings coupled to said body, said pair of wings being shaped to produce lift;

a flap member hingedly coupled to said pair of wings along a hinge line, said flap members being adjustable in a plurality of positions relative to said pair of wings so as to achieve a generally optimal position capable of maintaining attachment of the shock wave along a leading edge of said flap member at hypersonic speeds;

a drive system operably pivoting said flap member about said hinge line in response to said signal; and a controller operably coupled to said deflectable flap systems, said controller determining said optimal position and outputting a signal.

7. The hypersonic aircraft according to claim 6 wherein said hinge line is generally aft of said leading edge.

8. The hypersonic aircraft according to claim 6 wherein each of said flap members is individually actuatable.

9. The hypersonic aircraft according to claim 6 wherein said body and said pair of wings are integrally formed to define a generally continuous lifting member.

10. An aerodynamic control system for an aircraft comprising in combination:

a hypersonic aircraft having a wing-body, said hypersonic aircraft producing a shock wave, a shape of said shock wave changing depending on Mach number and angle of attack;

a flap member hingedly coupled to said wing-body along a hinge line, said flap members being positionable in a first position where said flap members are generally planar with said wing-body, a second position where said flap members are generally non-planar with said delta wing, and a plurality of immediate positions between said first position and said second position, said flap members being positioned to maintain attachment of said shock wave along a leading edge of said flap member at hypersonic speeds;

a drive system operably pivoting said flap member about said hinge line in response to said signal; and a controller operably coupled to said deflectable flap systems, said controller determining said optimal position and outputting a signal.

11. The aerodynamic control system according to claim 10 wherein said hinge line is generally aft of said leading edge.

12. The aerodynamic control system according to claim 10 wherein each of said flap members is individually actuatable and differentially deflectable.

* * * * *